United States Patent [19]

DeMoss

[11] 4,431,203
[45] Feb. 14, 1984

[54] STEERING ARRANGEMENT FOR RECUMBENT BICYCLE OR THE LIKE

[75] Inventor: Larry A. DeMoss, 970 Joppa Rd., Mooresville, Ind. 47158

[73] Assignees: Larry A. DeMoss; Stephen A. Edwards, both of Mooresville, Ind.

[21] Appl. No.: 338,226

[22] Filed: Jan. 11, 1982

[51] Int. Cl.³ ............................................. B62K 21/00
[52] U.S. Cl. ............................ 280/270; 280/281 LP
[58] Field of Search ............... 280/270, 271, 272, 279, 280/276, 281 LP, 92

[56] References Cited

U.S. PATENT DOCUMENTS

| | | | |
|---|---|---|---|
| 1,404,274 | 1/1922 | Cooper | 280/270 X |
| 1,784,419 | 12/1930 | Devito | 280/270 X |
| 3,521,904 | 7/1970 | Sheffer | 280/270 |
| 3,753,577 | 8/1973 | Robinson | 280/281 LP |
| 4,283,070 | 8/1981 | Forrestall et al. | 280/281 LP |

FOREIGN PATENT DOCUMENTS 2233218  1/1975  France ............................ 280/263

*Primary Examiner*—John A. Pekar
*Attorney, Agent, or Firm*—Barnes & Thornburg

[57] ABSTRACT

An arrangement for coupling a seat to the frame of a recumbent bicycle includes brackets on the seat for engaging a frame member of the bicycle, openings in the frame member and the brackets for alignment and locking pins for insertion into the aligned openings to attach the seat to the frame. A steering arrangement for the recumbent bicycle includes a fork for supporting the steerable front wheel of the bicycle, a fork tube on the frame for pivotally supporting the fork from the frame, a pair of steering arms on the fork, a handlebar pivotally mounted on the frame generally beneath the seat, and cables coupling the steering arms to respective sides of the handlebar.

6 Claims, 9 Drawing Figures

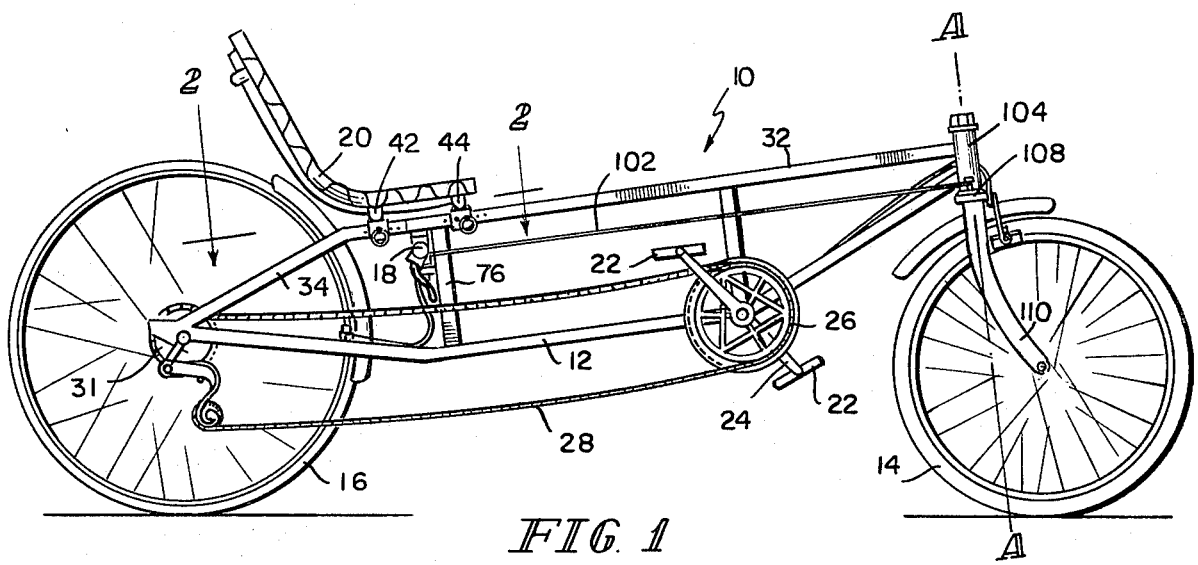
FIG. 1
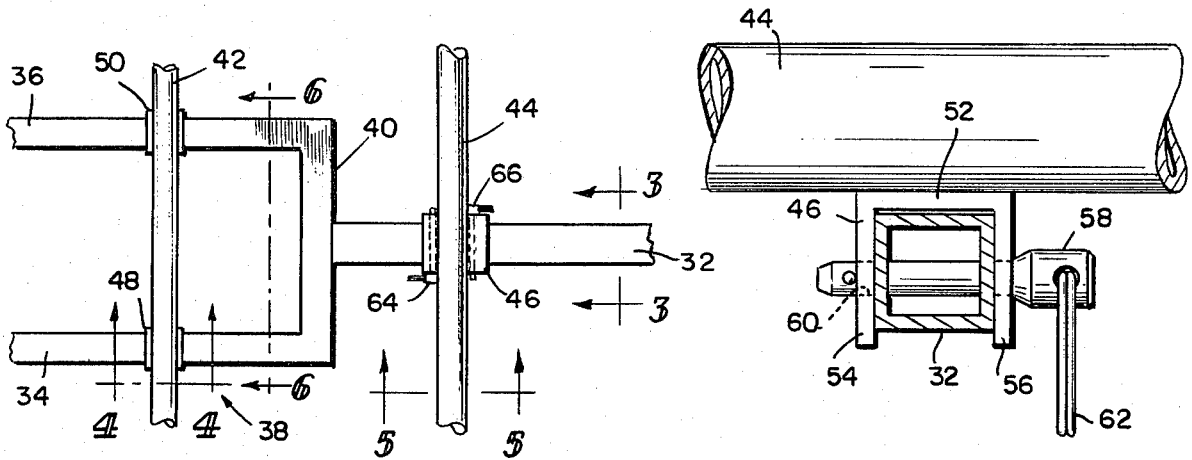
FIG. 2
FIG. 3
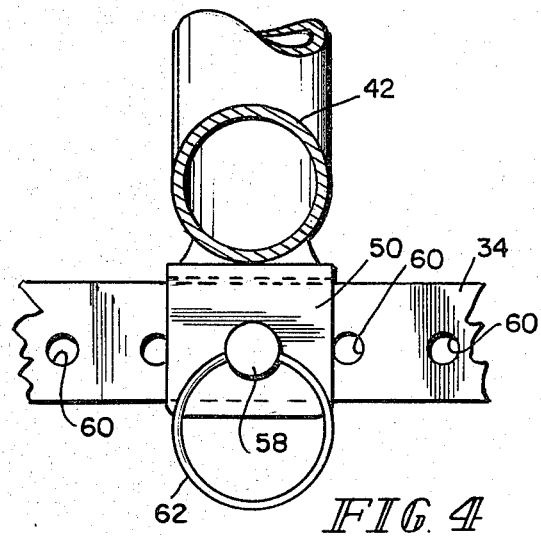
FIG. 4
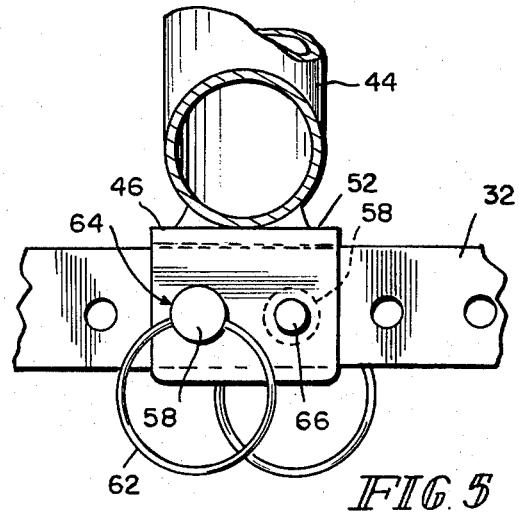
FIG. 5

STEERING ARRANGEMENT FOR RECUMBENT BICYCLE OR THE LIKE

The present invention is directed to bicycles, tricycles, motorcycles, and the like which shall hereinafter be generically referred to as cycles and in particular to an arrangement for coupling a seat to the frame of a cycle and a steering mechanism for such a cycle. The invention has particular utility in the area of recumbent bicycles.

Recumbent bicycles typically employ a horizontally elongated frame supported by a front wheel of somewhat smaller diameter than the rear wheel. A pedal crank is supported on the frame well in front of the bicycle seat which is typically positioned in the immediate vicinity of the rear wheel and appears not unlike a reclining lawn chair seat. Beneath the seat there is provided a steering mechanism which controls the front wheel of the bicycle. Recumbent bicycles of this general configuration are not new, with variations on the basic design being present at least as early as 1932 and perhaps before the turn of the century. Recent interest in recumbent bicycle design is found in *Bicycling*, Aug. 1981, pages 74–77 and page 82, and the *Arizona Daily Star*, Aug. 23, 1981, page 12e.

Despite the long-time presence of recumbent bicycles, some long-standing problems are coming to light with the renewed interest in the basic design. Certain difficulties have been experienced in both seat-frame attachment and adjustment mechanisms and steering mechanisms, particularly where the design provided for steering to be achieved by means of handles situated beneath the bicycle seat. It is therefore an object of the present invention to provide a particularly advantageous arrangement coupling a seat to the frame of a cycle, and in particular a recumbent bicycle which will allow adjustment of seat position with respect to the frame to provide for variations in leg length of the rider of such a cycle. A further object of the present invention is to provide a particularly advantageous steering mechanism for a cycle, particularly for a recumbent bicycle wherein the handle bars for the steering mechanism are positioned beneath the seat of the recumbent bicycle.

The objects of the present invention are satisfied by providing a somewhat C-shaped bracket for engaging a frame member of the cycle on which a seat is to be mounted. A plurality of openings are provided in the frame member and in the bracket for co-alignment. Means are provided for insertion into the aligned openings of the frame member and bracket to attach the seat to the frame. A plurality of brackets at least one of which is C-shaped can be provided in fixed relationship to the seat. The C-shaped bracket can include a central connecting leg and two end legs extending away from the central connecting leg. The two end legs are preferably arranged in substantially parallel arrangement so as to engage the opposite sides of the cycle frame which is itself preferably square in cross section.

The objects of the present invention are further satisfied by a steering mechanism which includes a fork supporting a steerable wheel which is pivotally mounted with respect to a cycle frame. A pair of generally oppositely projecting steering arms are provided on the fork. A handlebar steering control is pivotally mounted with respect to the frame. Cables are provided coupling the fork steering arms to respective sides of the handlebar steering control, whereby manipulation of the handlebar steering control affects steering of the steerable wheel. Preferably, the cables include a turnbuckle for adjusting the tension of at least one of the cables. Further, there can be provided load-bearing surfaces on the frame of the cycle and a thrust bearing inserted between each of the load-bearing surfaces and an adjacent surface of a block inserted between the facing surfaces. A pivot pin is inserted into aligned openings in the load-bearing surfaces to mount the block pivotally on the frame. The handlebar steering control can then be mounted so as to project from the block.

The various features and advantages of the present invention will be apparent to those of ordinary skill in the art upon a review of the accompanying drawing illustrating the invention and showing a preferred embodiment exemplifying the best mode of carrying out the invention as presently perceived.

In such drawing:

FIG. 1 is an elevation view of the right side of a recumbent bicycle incorporating the features of the present invention;

FIG. 2 is a sectional view of the seat-coupling arrangement shown in FIG. 1, the section taken along lines 2—2;

FIG. 3 is a sectional view of FIG. 2 taken along lines 3—3;

FIG. 4 is a sectional view of FIG. 2 taken along lines 4—4;

FIG. 5 is a sectional view of FIG. 2 taken along lines 5—5;

Figure 6:
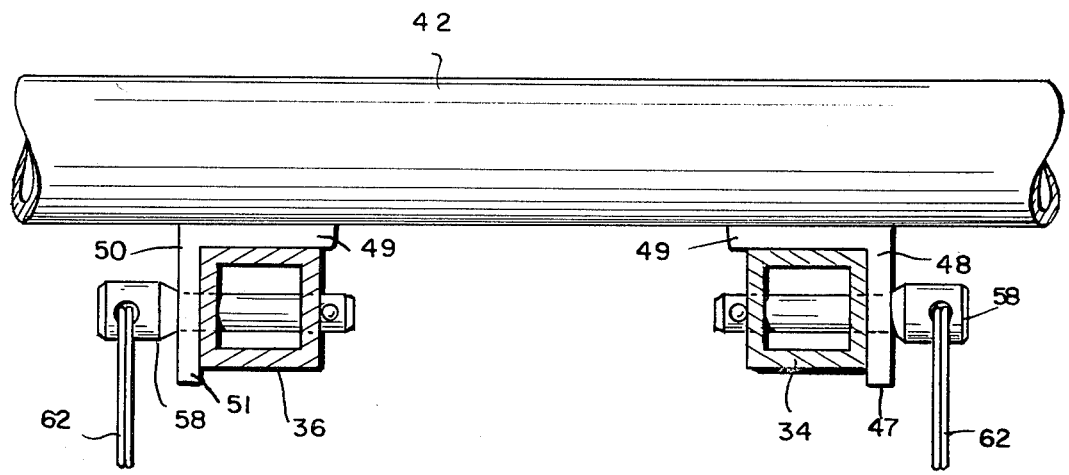
FIG. 6 is a sectional view of FIG. 2 taken along lines 6—6.

A recumbent bicycle 10 consists generally of a bicycle frame 12 supported for motion on a front wheel 14 and a rear wheel 16, the front wheel 14 is steerable, that is, turnable about an axis A—A, by means of handlebars 18 positioned beneath a seat 20. The seat 20 is adjustably attached to frame 12. The bicycle 10 is powered in forward motion by an occupant exerting force on pedals 22 which are attached to crank 24 fixed in turn to sprocket 26 in the usual manner. A chain 28 engaging sprocket 26 also engages a rear sprocket 30 attached to rear wheel 16 whereby the bicycle 10 is driven in forward motion.

The frame 12 of bicycle 10 includes a top longitudinal support bar 32 which, at its rearward end, is bifurcated into two rearwardly extending members 34 and 36 forming a top rear wheel support fork 38. The top rear wheel support fork 38 and its connection with the top longitudinal bar 32 is shown in plan view in FIG. 2 to include transverse framing member 40.

The seat 20 includes lower support frame members 42 and 44 which extend laterally with respect to the longitudinal frame member 32. A forward C-shaped bracket 46 is fixed to forward seat support 44 generally along the longitudinal center line of the seat and adjustably engages longitudinal support 32. Rear brackets 48 and 50 are fixed to lateral support 42 and engage legs 34 and 36 of rear top fork 38, respectively.

The brackets 46, 48, and 50 can be similarly constructed as shown in FIG. 3 to include a central connecting leg 52 fixed to one of the lateral seat supports 42 or 44. Two end legs 54 and 56 extend away from the connecting leg 52 and engage the periphery of a longitudinal frame member such as frame member 32. Preferably, the C-shaped bracket 46 and the frame member 32 are of square cross section to thereby enhance resistance to torque. The brackets 46, 48, and 50, and the frame members 32, 34, and 36 each include openings, shown in detail in FIGS. 4 and 5, which can be aligned by longitudinal adjustment of seat 20 with respect to frame 12. A pin means 58 can then be inserted into the aligned openings to secure seat 20 to frame 12.

The brackets 48 and 50, one of which is shown in FIG. 4, can be constructed in C-shaped form similar to bracket 46. The pin means 58, which is inserted through bracket 50 and longitudinal support leg 36 by means of apertures 60, can include a pull ring 62 to provide for convenient manipulation of the pin means 58.

Alternatively, brackets 48 and 50 can be constructed as shown in FIG. 6 such that right bracket 48 includes a central or top leg 49 and a right leg 47. Left bracket 50 includes a central or top leg 49 and a left leg 51. The left leg 51 on the left bracket 50 and the right leg 47 on right bracket 48 provide the lateral stability required, the right leg 47 acting on the outside of member 34 and the left leg 51 acting on the outside of member 36. It will be appreciated that the brackets 48 and 50 could be reversed so that the single depending legs 47 and 51 would act on the outside of members 34 and 36, respectively. In either event, the pin means 58 would preferably be inserted through legs 47 or 51 such that the head 59 to which pull ring 62 is attached abuts the leg rather than the corresponding support member 34 or 36. The brackets 48 and 50 would be attached to support 42 in a manner similar to that shown in FIGS. 4 and 5, i.e., by welding or the like.

The front C-shaped bracket 46 shown in FIGS. 3 and 5 can include a pair of apertures 64 and 66 for receiving appropriate pin means 58. The pair of apertures 64 and 66 provide for improved attachment over that of a single aperture.

Figures 7, 8:
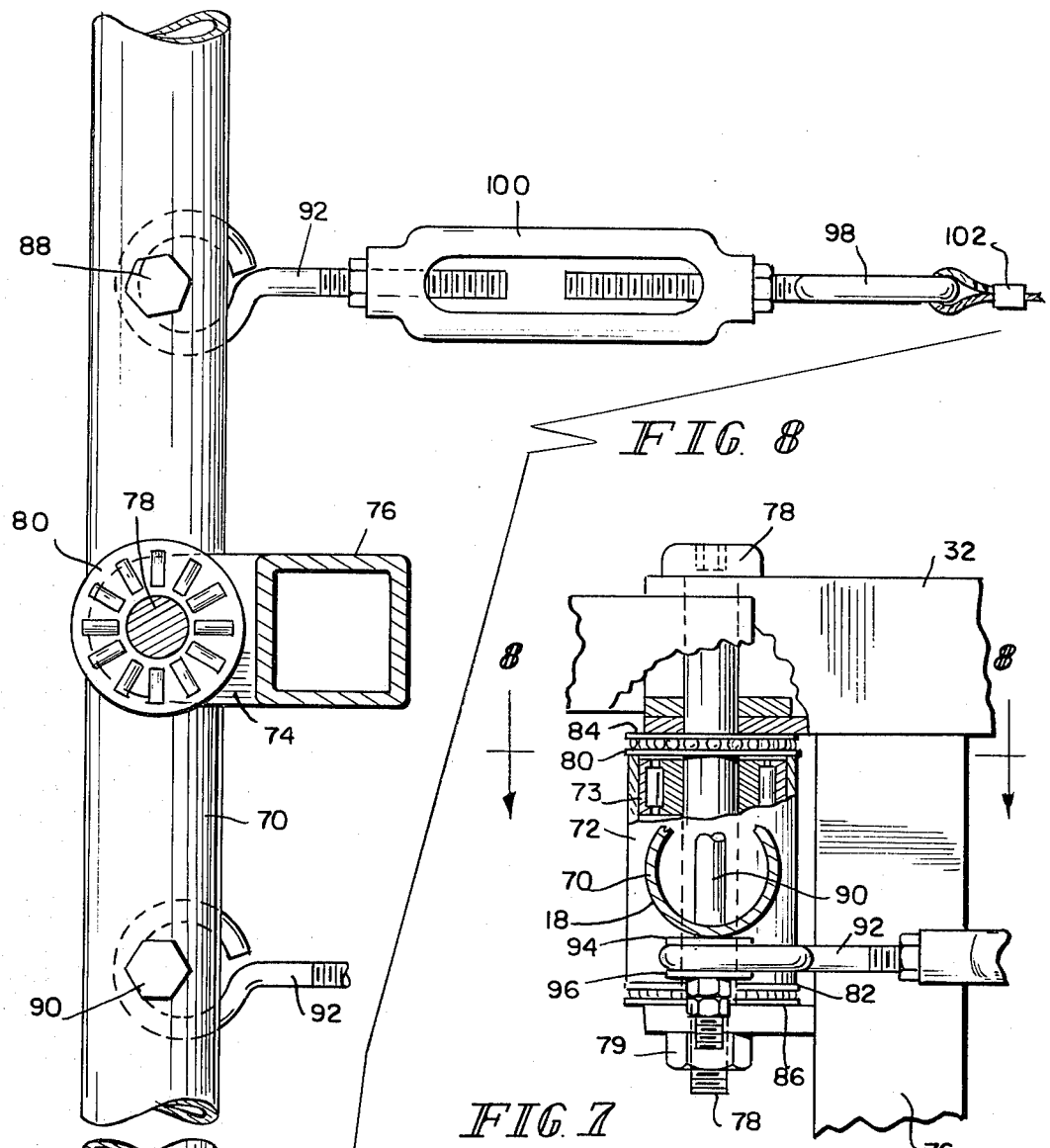
FIG. 7 is a sectional detail view of the steering mechanism for the bicycle shown in FIG. 1.
FIG. 8 is a sectional view of that shown in FIG. 7 taken along lines 8—8.

FIG. 7 shows a more detailed view of the handle bars 18 which provide for steering of the bicycle 10. The handle bar 18 includes a laterally extending tubular member 70 fixed to a vertically oriented bearing cylinder block 72. The bearing block 72 is captured between the rearward end of longitudinal support bar 32 and a rearwardly projecting flange 74 fixed to vertical frame support 76 by means of a pivot pin 78. Pivot pin 78 in the form of a shoulder bolt is inserted from the top through longitudinal support 32 and is threadably engaged into nut 79 below support flange 74. The bearing cylinder 72 is supported with respect to pivot pins by a pair of cylindrical cages of needle bearings 73 surrounding the pivot pin 78. An upper and lower needle thrust bearing 80 and 82 support bearing cyclinder 72 between thrust washers 84 and 86 adjacent frame 32 and flange 74, respectively.

Figure 9:
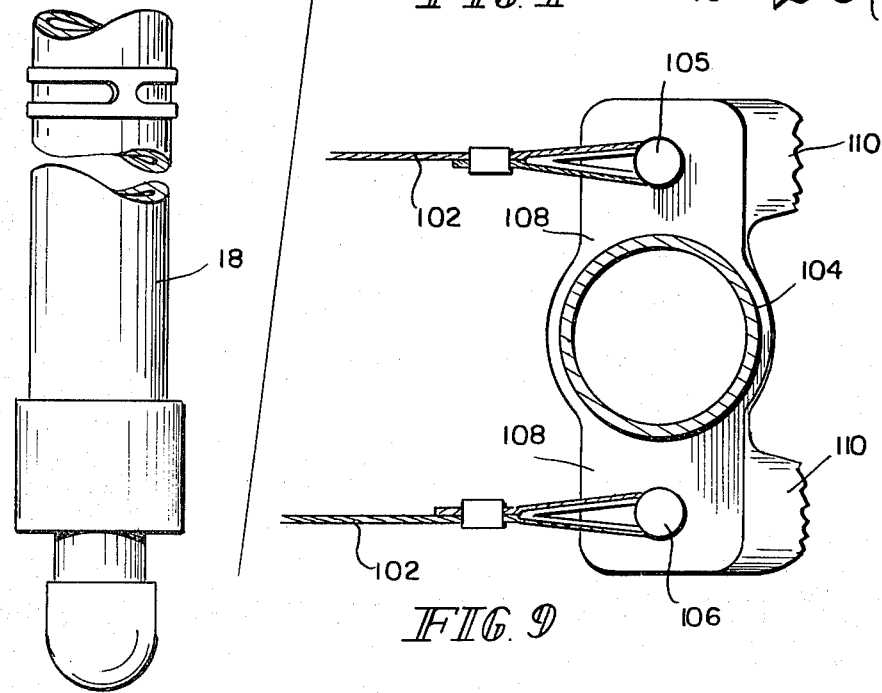
FIG. 9 is a sectional plan view of the front fork portion of the steering mechanism shown in FIG. 1.

At a convenient distance laterally on each side of pivot pin 78 are positioned steering bolts 88 and 90 as shown in FIG. 8. An eye bolt 92 is received on each steering bolt 88 and 90 between a pair of washers 94 and 96. The eye bolt 92, together with mating eye bolt 98 and turnbuckle 100, form a means for longitudinally adjusting steering cables 102 which extend from the handlebar 18 forward to the steerable front fork 104 of bicycle 10 as shown in FIG. 9. The front end of cable 102 is received on steering pins 105 and 106 which are positioned on either side of axis A—A. Thus, the rearward motion of the right side of handlebar 18 causes the front wheel to turn to the right.

A mechanical advantage can be enjoyed by spacing turning bolts 88 and 90 from each other by a distance greater than the spacing of pins 105 and 106 on fork 104. Somewhat tighter turning radii may be enjoyed by diminishing the distance between steering bolts 88 and 90. The pins 106 are fixed to steering arms 108 which project laterally on each side of axis A—A and from each steering arm 108 depends the legs 110 forming the front wheel fork.

While the present invention has been described in detail with reference to the accompanying figures, other variations within the spirit and scope of the invention as defined in the appended claims will be apparent to those skilled in the art.

What is claimed is:

1. A steering mechanism for a cycle having a frame, the steering mechanism comprising a fork for supporting a steerable wheel, means for pivotally mounting the fork on the frame, means providing a pair of generally oppositely projecting steering arms on the fork, a handlebar steering control providing a pair of generally oppositely projecting steering arms, means for mounting the steering control pivotally from the frame, and cables coupling respective fork steering arms to respective steering control steering arms whereby manipulation of the steering control effects steering of the steerable wheel, the means for pivotally mounting the steering control including means providing two facing, load-bearing surfaces on the frame, a block for insertion between the facing surfaces, a thrust bearing for insertion between each of the load-bearing surfaces and a respective adjacent surface of the block, means providing aligned openings in the load-bearing surface-providing means, the block and the thrust bearings, a pivot pin for insertion into the aligned openings to mount the block pivotally upon the frame, and means for mounting the handlebar steering control to project from the block.

2. The apparatus of claim 1 wherein the thrust bearings comprise roller thrust bearings for insertion between each of the load-bearing surfaces and a respective adjacent surface of the block.

3. The apparatus of claim 2 wherein the roller bearings are needle bearings.

4. The apparatus of claim 1 wherein the pivot pin comprises a shoulder bolt.

5. The mechanism of claim 1 and further comprising a turnbuckle for adjusting the tension of one of said cables.

6. The apparatus of claim 1 and further comprising roller bearings for insertion between the pivot pin and the block.

* * * * *